United States Patent [19]

Isom

[11] 3,897,080

[45] July 29, 1975

[54] ELECTRIC LIGHT CART

[76] Inventor: William C. Isom, 9430 Folkstone, Dallas, Tex. 75220

[22] Filed: Oct. 15, 1973

[21] Appl. No.: 406,478

[52] U.S. Cl. .............. 280/47.19; 182/16; 182/129; 312/235
[51] Int. Cl. ............................................ B62b 1/12
[58] Field of Search .......... 280/47.19, 47.18, 47.35, 280/47.34; 182/16, 129, 106; 312/235 R

[56] References Cited
UNITED STATES PATENTS

| | | | |
|---|---|---|---|
| 2,555,149 | 5/1951 | Mushta | 312/235 R X |
| 2,760,782 | 8/1956 | Hartzell | 280/47.19 |
| 2,775,499 | 12/1956 | Gleitsman | 312/235 R |
| 2,834,526 | 5/1958 | Paris | 182/16 |
| 3,495,850 | 2/1970 | Ziskal | 280/47.34 |

FOREIGN PATENTS OR APPLICATIONS

| | | | |
|---|---|---|---|
| 452,185 | 8/1936 | United Kingdom | 182/16 |

Primary Examiner—David Schonberg
Assistant Examiner—John A. Pekar
Attorney, Agent, or Firm—Richards, Harris & Medlock

[57] ABSTRACT

The specification discloses a cart for use in servicing elevated lights having a plurality of wheels and a handle assembly thereon. An elongated vertically extending storage compartment is formed in the cart for receiving a carton containing a plurality of fluorescent lights. A removable closure member with a plurality of circular openings therein is provided for the storage compartment. Steps are formed on the cart for elevating an individual and storage compartments are formed under the steps. Telescoping supports are provided on the handle assembly for extending the handle assembly to an elevated position to stabilize an individual supported thereon.

11 Claims, 6 Drawing Figures

PATENTED JUL 29 1975 3,897,080

SHEET 1

ELECTRIC LIGHT CART

BACKGROUND OF THE INVENTION

The present invention relates to improvements in service carts, and more particularly to an improved cart for use in servicing lights and for providing storage space for a plurality of different sizes of lights. In addition, an elevated platform is provided on which a serviceman may stand during use of the cart to reach elevated lights and the like.

In the servicing of lights in buildings, and the like, it has been common practice for a serviceman to carry a large carton or cartons containing long fluorescent light bulbs, incandescent bulbs, ballasts, starters, tools, and other implements which may be needed during the servicing operation. The fluorescent light bulbs are long, bulky and quite fragile and therefore, must be handled with great care. In addition, a suitable ladder must be carried to allow the serviceman to reach the elevated lights on the walls and ceilings of the building. In many cases, two servicemen are required, i.e., one to carry the carton of bulbs and the other to carry the ladder. If one serviceman is used, two trips are required to transport the carton of bulbs and the ladder. Although these methods have served their purpose, they have not proved entirely satisfactory under all conditions of service for the reason that these methods are time consuming and an inefficient use of man power. In addition, the manual transportation of these bulky, fragile fluorescent bulbs can result in broken bulbs which are both dangerous and expensive.

Therefore, the general purpose of the present invention is to eliminate the necessity of carrying a separate ladder and cartons. Accordingly, the present invention provides an improved service cart having a plurality of wheels for allowing the cart to easily move. A first storage compartment is provided of a size to receive a carton containing a plurality of elongated fluorescent bulbs therein. A removable closure is provided for the upper end of the storage compartment to allow the insertion of individual fluorescent bulbs therein when a carton is not present in a compartment. Additional storage compartments are provided with rigid upper surfaces which can be used as steps to elevate a serviceman to a height sufficient to provide access to overhead and elevated wall and ceiling lamps. In addition, a handle assembly is provided on the cart for use in guiding the cart as it is moved. Telescoping supports are provided on the handle assembly to extend the handle to an elevated position wherein it can be used as a safety rail or stabilizing rail by the serviceman standing on the elevated portion of the cart.

The objects and many of the attendant advantages of the present invention will be readily appreciated by those of ordinary skill in the art as the same becomes better understood by reference to the following Detailed Description when considered in connection with the accompanying Drawings in which:

DESCRIPTION OF THE PREFERRED EMBODIMENTS

Figure 3:
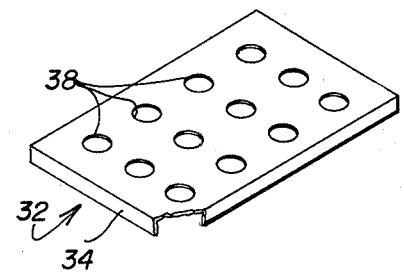
FIG. 3 is a front perspective view of the closure member.

Referring now to the Drawings wherein like reference characters designate like or corresponding parts throughout the several views, there is illustrated in FIGS. 1 through 4, a service cart identified for purposes of description by reference numeral 10. The cart 10 is used in the service of electrical lights, fixtures, and the like, within a building. The cart is compact so as to be easily maneuverable through doorways, and into stairwells, and other locations in buildings. The cart is provided with a plurality of compartments for storage and transportation of a plurality of fluorescent and incandescent bulbs and various tools and accessories. The cart provides an elevated step or platform upon which a serviceman can stand to gain access to elevated ceiling and wall lamps and fixtures. The cart thus provides an improved self-contained device for use by one person to service elevated lights and fixtures.

Figure 1:
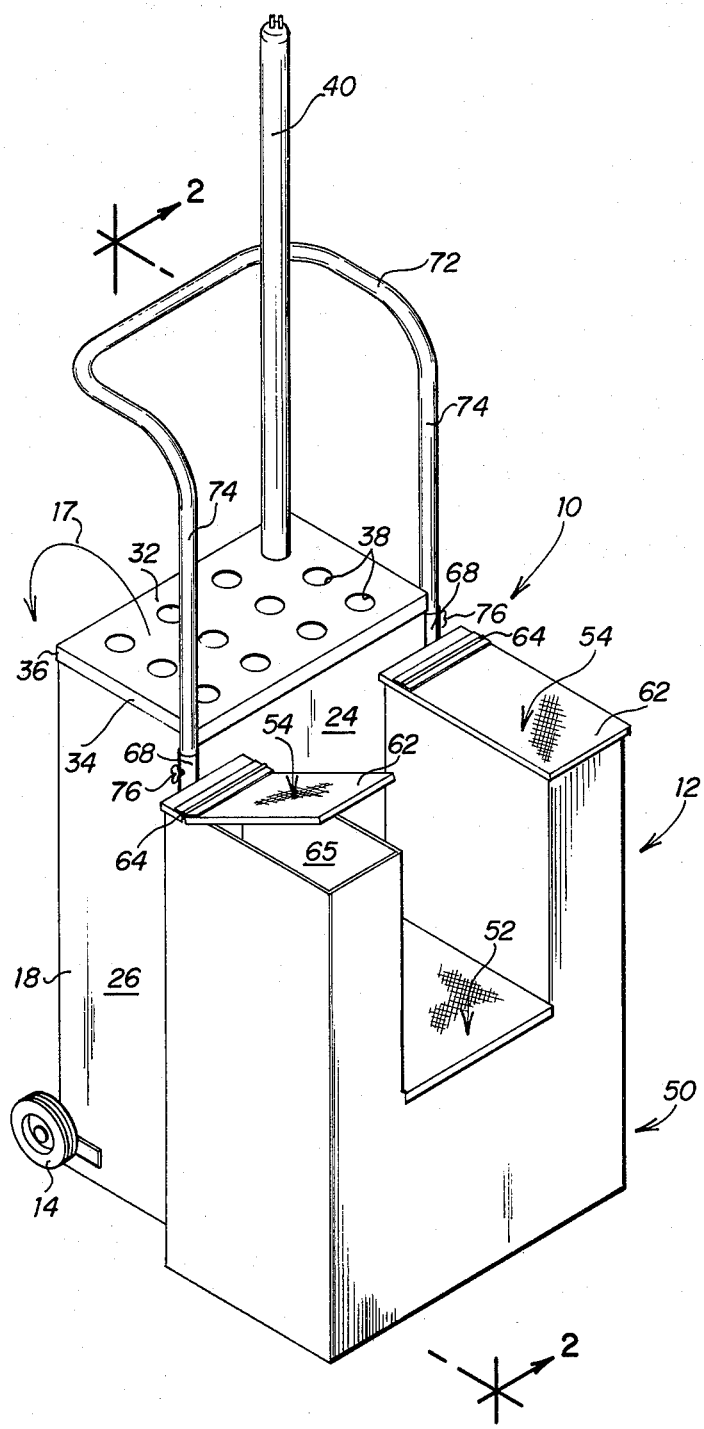
FIG. 1 is a front perspective view of the first preferred embodiment of the service cart of the present invention.
Figure 2:
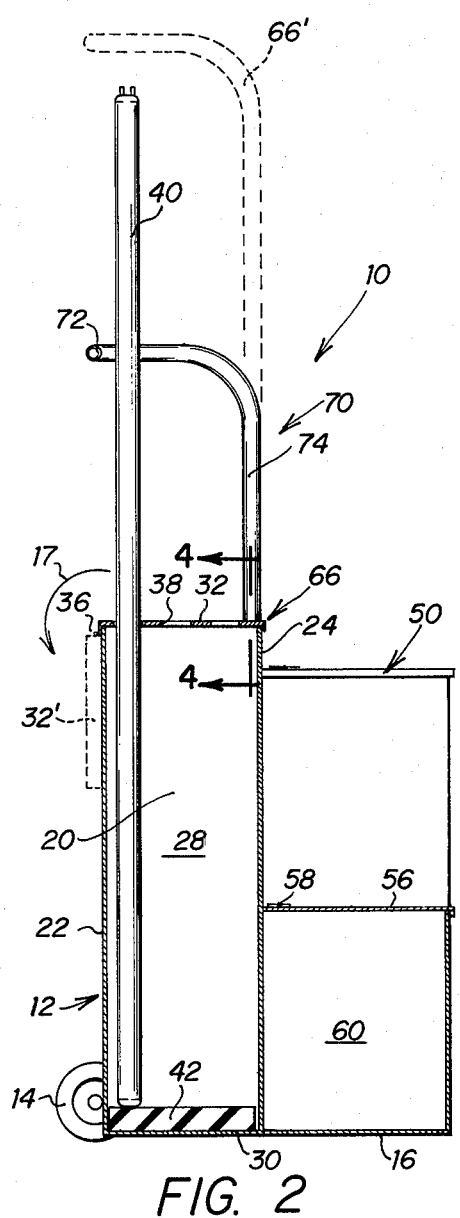
FIG. 2 is a section view taken on line 2—2 of FIG. 1 looking in the direction of the arrows.
Figure 4:
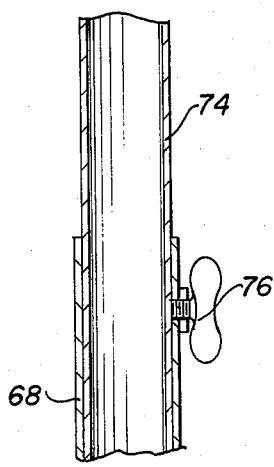
FIG. 4 is a section view taken on line 4—4 of FIG. 2 looking in the direction of the arrows.

The particular improved features of the first embodiment of the present invention are illustrated in FIGS. 1 through 4. This first embodiment of the improved service cart 10 is illustrated as having a housing 12 with a pair of rotatable wheels 14 mounted adjacent to the rear thereon. These wheels 14 are mounted to rotate about a common horizontal axis and are positioned on the cart in a manner similar to the wheels on a dolly such that the cart 10 can rest on a surface in a relatively stable position as is illustrated in FIG. 2. In this position, the cart will be supported by the wheels 14 and the bottom 16 of the front portion of the cart providing a substantial three-point suspension of the cart. The wheels 14 extend to the rear of the cart such that when the housing is tilted in the direction of arrow 17, the cart 10 can be moved as desired on the wheels by balancing the weight of the cart thereon.

The maximum width of the housing 12 is selected to be less than that of a doorway so that the cart can be easily maneuvered throughout the building. The housing 12 has a first section 18 which defines a first storage compartment 20. This storage compartment has rectangular rear, front, left and right sides, and bottom walls 22, 24, 26, 28 and 30. These walls are attached together at their edges to form an elongated, rectangular vertically extending storage compartment 20.

The upper end of the storage compartment 20 is provided with a closure member 32. This closure member 32 has a flange 34 which extends completely around the periphery thereof to fit along the outside of the front and side walls 24, 26 and 28 as shown in FIGS. 1 and 2.

An elongated hinge 36 is provided at the rear of the closure member 32 to allow the closure member 32 to rotate from the position illustrated in FIGS. 1 and 2, in solid lines, to the position illustrated in dotted lines in FIG. 2 identified as 32'. In this position, the closure member 32' lies adjacent to the rear wall 22 and is displaced from the open end of the storage compartment 20.

The closure member 32 is illustrated in FIG. 3 and is provided in a plurality of spaced circular openings 38 therein of a size to allow the insertion of the elongated fluorescent bulbs therethrough. The openings 38 provide vertical positioning in the storage compartment 20 of bulbs 40. A layer of shock-absorbing material 42 can be attached to the inside of bottom wall 30 of compartment 20 to protect the bulbs 40 against damage during transport.

The closure member 32 could alternately be removably attached to the open end of storage compartment 20 such that when the closure 32 is not in use, it can be completely disconnected from the cart.

The storage compartment 20 is designed to be of a size and shape to receive a carton containing a plurality of fluorescent bulbs. The bulbs are carried in a vertically extending arrangement and can be individually removed from the carton as required. The compartment 20 can alternatively be used as illustrated in FIG. 1 with the closure 32 extending across compartment 20. The individual fluorescent bulbs are inserted through the openings 38 and are held separated thereby. The bulbs 40 can then be carried by the cart and removed as needed.

A second section 50 is attached to the outside of the front wall 24 of the first section 18. This second section has a lower step 52 centrally positioned on the cart 10. A pair of upper steps 54 elevated above the step 52 are positioned on either side thereof. The lower step 52 is provided with a closure 56 hinged at 58 to provide access to a storage compartment 60 located thereunder. This storage compartment 60 can be used to store incandescent bulbs, ballasts, starters, tools and the like.

The upper steps 54 have closure members 62 which are hinged at 64 to provide access to storage compartments 65 thereunder. These storage compartments are of sufficient length to provide storage space for smaller fluorescent bulbs and the like. A rubber matting material can be provided on the upper surface of steps 52 and 54 to provide a good surface to stand on. Step 52 is wide enough to accommodate both feet of a serviceman. In use, these steps can be used similar to a ladder with the step 52 used by a serviceman to mount steps 54. The serviceman then stands astraddle the cart with one foot on each step 54. These steps are placed at a sufficient height to allow servicemen to reach elevated lamps and fixtures which are located on the walls and ceilings of the buildings.

A handle assembly 66 is attached to the rear of the second section 50. The assembly 66 has a pair of vertically extending tubular members 68 and a handle member 70. The handle member 70 has a horizontal gripping portion 72 and two vertically extending portions 74 aligned to telescope into members 68. This telescoping arrangement is illustrated in detail in FIG. 4. Wing nuts 76 extend through threaded bores in members 68 for engaging portions 74. By loosening the nuts 76, portions 74 will freely slide in members 68. By tightening the nuts 76, portions 74 can be locked in the desired position.

While transporting the cart, the handle can be retracted to the lower position illustrated in FIG. 1. While installing and servicing lights, the handle assembly 66 can be extended to the elevated position illustrated in dotted lines as 66' in FIG. 2. In position 66', a service-man standing on steps 54 can use the handle as a hand rail.

The cart 10 illustrated in FIGS. 1 through 4 is compact and easily maneuverable and provides an elevated platform upon which a workman can stand during the servicing of elevated lamps and the like. In addition, storage compartments are provided which safely store and transport elongated fluorescent bulbs and other implements utilized in the servicing of the lights. Thus, one workman can readily maneuver the cart and utilize the same without the need of additional assistance.

Figure 5:
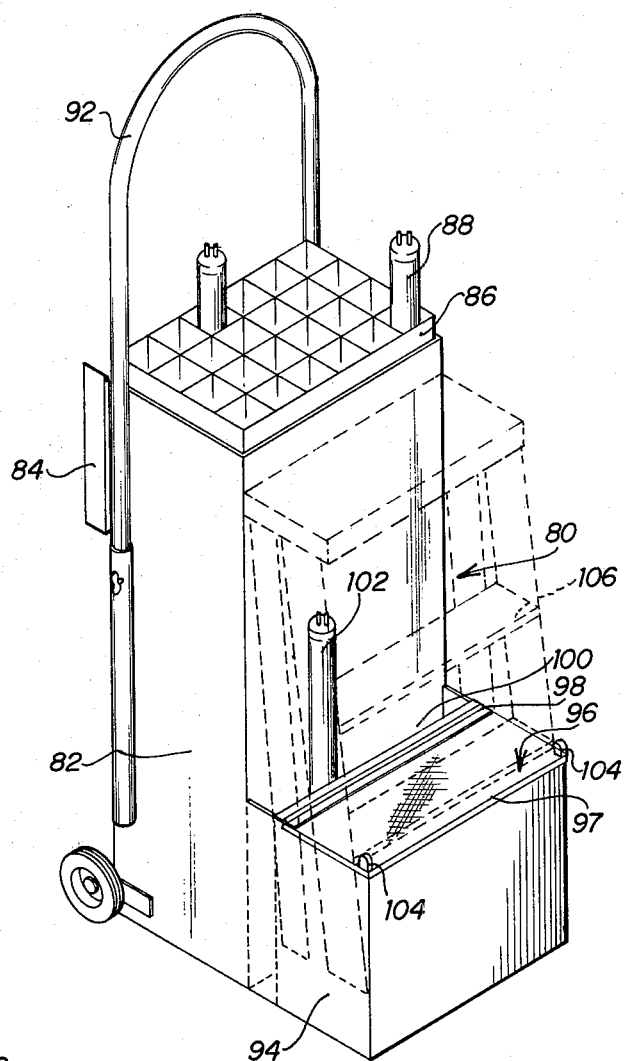
FIG. 5 is a front perspective view of the second embodiment of the present invention with the closure member removed and a carton of fluorescent bulbs inserted therein.

A second embodiment of the improved cart of the present invention is illustrated in FIG. 5. This cart 80 has a first section 82 which is provided with front, rear, side and bottom walls identical in shape and construction to section 18 of the first embodiment. This first section 82 has a closure member 84 identical in construction to the closure member 32 in the first embodiment. This closure member is illustrated rotated to a position adjacent to the rear wall of section 82.

A carton 86 containing a plurality of fluorescent bulbs 88 is illustrated inserted into the section 82. Wheels 90 and handle assembly 92 allow maneuvering of the cart 80 as desired. The handle assembly 92 is provided with telescoping sections as illustrated in the first embodiment. In the alternative, cart 80 could be provided with two handle assemblies — one fixed in the position illustrated in FIG. 5, and the other fixed at an elevated position whereby it may be used as a safety rail.

A second section 94 is provided on the cart 80 and forms an elevated step 96 for use in the installation and servicing of lights. The step 96 has a top 97 with a hinge 98. The top 97 allows access to a storage compartment located therebelow. An elongated slot 100 is provided between the hinged portion of top 97 and the front wall of section 82. This slot 100 can be used to carry a plurality of shorter fluorescent bulbs 102 as illustrated in FIG. 5.

Tabs 104 can be provided on the top 97. These tabs 104 can be used to engage and carry a step ladder 106 as shown in dotted lines.

Figure 6:
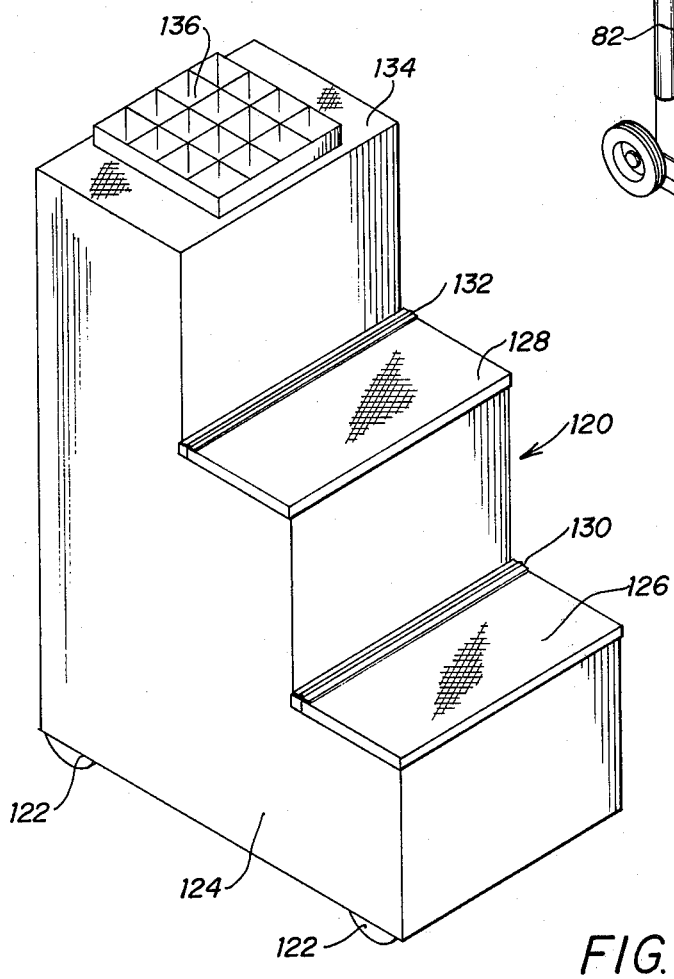
FIG. 6 is a front perspective view of the third preferred embodiment of the present invention.

A third embodiment is illustrated in FIG. 6. This cart 120 is supported by four wheels 122 and has a frame 124 which is generally stairstep in design. The two lower steps 126 and 128 define storage compartments thereunder and are provided with hinges 130 and 132, respectively. The upper step 134 is provided with a central storage section 136 for holding a plurality of fluorescent bulbs. A portion of the step 134 can be used for standing in the installation and servicing of elevated lights and the like.

The present invention provides an improved service cart that is easily maneuverable and which is provided with elevated surfaces for use by servicemen in reaching ceiling and wall mounted lights and light fixtures. In addition, adequate storage is provided for transporting light bulbs, parts and tools which are necessary during the servicing operation. It is to be understood, of course, that the foregoing description relates to preferred embodiments of the present invention and that numerous modifications and alterations may be made therein without departing from the spirit and scope of the invention as set forth in the appended claims.

What is claimed is:

1. A cart for servicing elevated lights comprising:

a wheeled housing having a first section for receiving a plurality of elongated fluorescent light bulbs in vertical positions, said housing having a second section attached to a wall of said first section with upper and lower steps formed thereon, said lower step being located in the center of said second section and said upper steps being located on either side of said lower step.

2. The cart of claim 1 further comprising a handle to enable transportation of said cart and means for raising said handle to stabilize a workman while standing upon said steps.

3. The cart of claim 1 wherein said upper and lower steps form storage compartments.

4. The cart of claim 1 further comprising a removable closure means for said first section, said closure having a plurality of circular openings therethrough whereby a fluorescent bulb can be inserted therethrough.

5. A cart comprising:

a housing having wheels rotatably connected on the lower portion thereof, a first section defining storage compartments formed in said housing, a second section attached to a wall of said first section and including a lower step formed in the center portion of said housing for supporting the weight of a person, a pair of upper steps disposed above said lower step and located on either side of said lower step, said steps being dimensioned such that a person may initially place a foot on said lower step and then sequentially place both feet upon said upper steps, and a removable closure means for said first section, said closure having a plurality of circular openings therethrough whereby a fluorescent bulb can be inserted therethrough.

6. The cart of claim 5 further comprising a handle to enable transportation of said cart.

7. The cart of claim 6 further comprising means for raising said handle to stabilize a workman while standing on said steps.

8. The cart of claim 5 wherein said upper and lower steps form storage compartments.

9. A cart for servicing elevated lights comprising:

a housing, a plurality of rotatable wheels on said housing for moving said cart about the floor, a first section in said housing defining an elongated chamber, said first chamber being open at the top and of a size for receiving a fluorescent light bulb carton therein with said lights extending in a vertical direction, a closure member attached to said first section adjacent the top of said chamber, said closure being movable between a first position wherein said closure is removed from the opening of said chamber and lies adjacent to a wall of said first section and a second position wherein said closure extends across the opening of said chamber, said closure having a plurality of openings extending therethrough for use in positioning fluorescent bulbs vertically in said chamber when said closure is in said second position, resilient means at the bottom of said chamber, a second section in said housing with upper and lower steps formed thereon, said lower step being formed by the top of a storage container and centrally located on said second section, said upper steps being formed by the tops of storage containers and located on either side of said first step, and handle means attached to said housing for moving said cart, means on said handle means for extending the height of said handle for stabilizing an individual supported on said steps.

10. A cart for servicing elevated lights comprising:

a housing, a plurality of rotatable wheels on said housing for moving said cart about the floor, a first section in said housing having walls defining an elongated chamber, said first chamber being open at the top and of a size for receiving fluorescent light bulbs therein in a vertical direction, a second section in said housing attached to a wall of said first section with upper and lower steps formed thereon, said lower step being formed by the top of a storage container and centrally located on said second section, said upper steps being formed by the tops of storage containers and located on either side of said first step, and handle means attached to said housing for moving said cart.

11. A cart for carrying a ladder and servicing elevated lights comprising:

a housing, a plurality of rotatable wheels on said housing for moving said cart about the floor, a first section in said housing having walls defining an elongated chamber, said elongated chamber being open at the top and of a size for receiving a fluorescent light bulb carton therein with said lights extending in a vertical direction, a closure member removably attached to said first section adjacent the top of said chamber in a position wherein said closure extends across the opening of said chamber, said closure having a plurality of openings extending therethrough for use in positioning fluorescent bulbs vertically in said chamber when said closure is attached, a second section in said housing attached to a wall of said first section with a step portion formed thereon, said step portion being formed by the top of a storage container and being of a size to support a ladder, means on said step for retaining said ladder on said step, and handle means attached to said housing for moving said cart.

* * * * *